United States Patent [19]

Siratori

[11] Patent Number: 5,598,465
[45] Date of Patent: Jan. 28, 1997

[54] EXCHANGE CONTROLLING SYSTEM FOR MANAGING TERMINAL GROUPS

[75] Inventor: Sigeru Siratori, Kawasaki, Japan

[73] Assignee: Fujitsu Limited, Kanagawa, Japan

[21] Appl. No.: 636,893

[22] Filed: Apr. 24, 1996

Related U.S. Application Data

[63] Continuation of Ser. No. 333,512, Nov. 2, 1994, abandoned.

[30] Foreign Application Priority Data

Apr. 6, 1994 [JP] Japan ................................ 6-092956

[51] Int. Cl.⁶ ............................................. H04Q 3/64
[52] U.S. Cl. ................... 379/266; 379/265; 379/309; 379/211; 379/212; 379/201
[58] Field of Search ................................ 379/201, 207, 379/211, 212, 233, 265, 266, 267, 196, 309

[56] References Cited

U.S. PATENT DOCUMENTS

| | | | |
|---|---|---|---|
| 4,951,310 | 8/1990 | Honda et al. | 379/266 |
| 4,956,861 | 9/1990 | Kondo | 379/211 |
| 5,259,017 | 11/1993 | Langmantel | 379/212 |
| 5,291,549 | 3/1994 | Izumi | 379/233 |
| 5,329,523 | 7/1994 | Saito et al. | 379/211 |
| 5,329,578 | 7/1994 | Brennan et al. | 379/196 |
| 5,339,356 | 8/1994 | Ishii | 379/233 |
| 5,408,527 | 4/1995 | Tsutsu | 379/212 |
| 5,414,759 | 5/1995 | Ishikuri et al. | 379/212 |
| 5,422,944 | 6/1995 | Sakai | 379/267 |

FOREIGN PATENT DOCUMENTS 60-52150  3/1985  Japan ........................ H04M 3/00

*Primary Examiner*—Krista M. Zele
*Assistant Examiner*—Scott Wolinsky

[57] ABSTRACT

An exchanging and controlling system which manages terminal groups, has a plurality of terminals. Terminal numbers of the terminals used as a group are registered in the system. A group number corresponding to a switch service is assigned to each of a plurality of terminal groups used for an exchange service. A plurality of terminals of which each has an individual terminal number are registered to belong to each of the terminal groups. The number dialed by a subscriber includes at least one digit corresponding to its group number and at least one digit which corresponds to the terminal number of the destination terminal.

9 Claims, 10 Drawing Sheets

TEGN: Terminal Group Number

EXCHANGE CONTROLLING SYSTEM FOR MANAGING TERMINAL GROUPS

This is a continuation, of application Ser. No. 08/333,512, filed Nov. 2, 1994, now abandoned.

BACKGROUND OF THE INVENTION

1. Field of the Invention

The present invention relates to an exchange controlling system for managing terminal groups. More particularly, it relates to an exchange controlling system, in which terminal numbers are managed as groups and each service concept is correlated with a registered terminal number.

2. Description of the Related Art

In telephone-communication including facsimile communication or the like, there is a function of abbreviated dialing for frequently accessing to a fixed terminal that is, dialing the number of a subscriber for reducing complexity of dialing operations. Obviously, this is a method for reducing the number of times of the dialing operations by registering a number of figures as a terminal number.

In the registration of terminals according to the conventional abbreviated dialing function, a subscriber's private number or abbreviated dialing number is only given to a terminal, as shown in FIG. 12.

In FIG. 12, a table 12 illustrates an abbreviated dialing number registered as a private number per subscriber. In table 12, twenty abbreviated dialing numbers 00 to 19 are registered.

Further, one terminal number corresponds to one abbreviated dialing number. For example, a terminal number "$A_0 A_1$ to $A_{n-1} A_n$", corresponds to an abbreviated dialing number "*00".

However, the service employing the conventional abbreviated dialing function was limited to an abbreviated dialing service to simplify dialing operations and improve a call transferring service.

Meanwhile, the diversification of the targets for using a communication system brings a necessity for providing various kinds of communication services. There is also a demand in an exchanging function for improving various kinds of services on the basis of a new concept of managing terminals instead of the conventional abbreviated dialing function of 1 to 1.

For instance, there is the case where a plurality of terminals are considered as targets of communication. In such case, for example, in addition to terminal A, other terminals B and C are necessary which are intentionally communicated, whenever one terminal A is communicated. Therefore, the conventional abbreviated dialing function involves complex operations of the communication terminals.

SUMMARY OF THE INVENTION

Accordingly, it is an object of the present invention to provide an exchange controlling system for managing terminal groups, in which a subscriber private number (an abbreviated dialing number) corresponds to the terminal number for specifying the terminal.

It is another object of the present invention to provide an exchange controlling system for managing terminal groups, in which a terminal group is provided between a subscriber private number and a terminal number, and a service is given to the terminal group according to the subscriber private number and the terminal number.

Further, it is an object of the present invention to provide an exchange controlling system for realizing various kinds of exchanging functions to manage terminal groups.

An exchange controlling system for managing terminal groups according to the present invention comprises a plurality of terminal groups, each of which is constituted for an exchange service, a plurality of terminals respectively having a subscriber private number and being registered to belong to each of the terminal groups, said subscriber private number including a first abbreviated number of figures corresponding to one of the terminal groups and a second abbreviated number of figures corresponding to one of the terminals, whereby an exchange service can be exchanged to a terminal registered to a terminal group constituted for the exchange service.

Further, in the exchange controlling system for managing the terminal groups according to the present invention, some of the plurality of terminals may be registered so as to belong to more than two terminal groups.

Furthermore, in the present invention in another preferred embodiment, the system comprises a first table for registering a plurality of terminal numbers for terminals, a pointer for indicating registered positions of each of the terminal numbers in the first table, and a second table for registering terminal group data including information, indicating whether or not each of the terminals is registered to belong to a corresponding terminal group, wherein the terminals are respectively exchanged and connected to the terminal numbers registered in the first table with reference to the terminal group data in the second table.

According to still another embodiment of the present invention, the system comprises a network, a central processor for controlling an exchange and connection of the network, an individual memory for storing control data, by which the processor controls the exchange and connection of the network and a table having data of the correspondence of exchangeable and controllable services to the terminal groups, and a file memory including a first table for registering a plurality of terminal numbers, a pointer for indicating registered positions of each of the terminal numbers in the first table and a second table for registering terminal group data including information indicating whether or not each of the terminals is registered to belong to a corresponding terminal group, for storing subscriber data of terminal group numbers registered according to services permitted to subscribers, wherein the processor recognizes the terminal groups registered in the second table from the subscriber data and exchanges the network based on the services permitted to subscribers.

In yet another embodiment of the present invention, the central processor exchanges and controls the network so as to repeat the step of transferring a call from a subscriber and finishing the call, one by one, for all terminals registered to belong to a terminal group corresponding to a continuous call service by the subscriber in advance.

In a further embodiment, the central processor exchanges and controls the network so as to transfer a call from a subscriber to a terminal by switching subsequently, in the case where there is no response for a predetermined time to the call from the terminals registered to belong to a terminal group for transferring service by the subscriber in advance.

According to still a further embodiment, the central processor exchanges and controls the network so as to subsequently transfer a call directed from a first subscriber to a second subscriber to a plurality of terminals registered to belong to a terminal group corresponding to a call transferring service by the second subscriber in advance, in the case where the second subscriber cannot be connected for a predetermined time.

In yet another embodiment, the central processor exchanges and controls the network so as to transfer a first call directed from a first subscriber to a second subscriber to a plurality of terminals registered to belong to a terminal group corresponding to a multiple-transferring service by the second subscriber in advance, when the second subscriber cannot be connected to the first call for a predetermined time, and to transfer a second call, directed from a third subscriber, to the second subscriber to the terminals other than those which transferred the first call from the first subscriber, when the second subscriber cannot be connected to the second call for a predetermined time.

According to a further embodiment of the invention, the central processor exchanges and controls the network so as to transfer a first call, directed from a first subscriber to a second subscriber, to a plurality of terminals registered to belong to a terminal group corresponding to a call recording and transferring service by the second subscriber in advance, when the second subscriber cannot be connected to the first call for a predetermined time, and to transfer a second call, directed from a third subscriber to the second subscriber, to a voice mail registered to belong to a terminal group corresponding to a call recording and transferring service by the second subscriber in advance, when the second subscriber cannot be connected to the first call for a predetermined time.

In the exchange controlling system for managing terminal groups according to the present invention, the terminal groups are constituted per an exchanging service, as described above. The plurality of terminals (subscriber numbers) are registered to belong to each of the terminal groups. Then, the abbreviated numbers of figures are set to the terminal groups and terminals, thus constituting the subscriber private numbers.

Further, in the system according to the present invention, the terminals registered to belong to the exchanging service in the corresponding terminal group are exchanged and controlled subsequently.

According to the present invention, the problem of complex operations of dialing subscriber numbers to each of terminals one by one when the call is subsequently sent to the plurality of terminals belonging to the common terminal group can be solved.

DESCRIPTION OF THE PREFERRED EMBODIMENTS

Management of terminal groups carried out by an exchange controlling system for managing terminal groups according to the present invention will be described with reference to FIG. 1, in advance of explanation of specific embodiments of the present invention.

Figure 1:
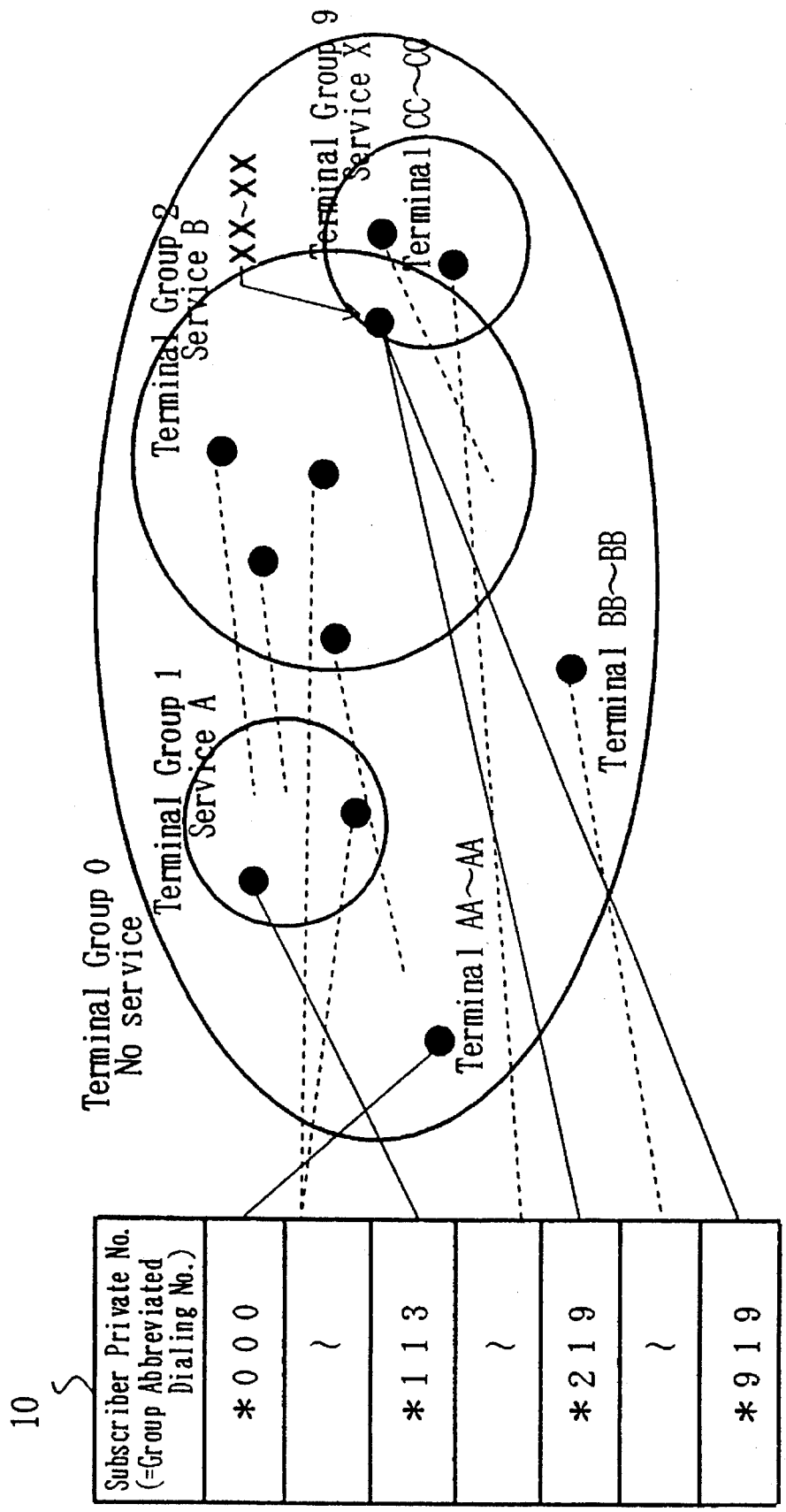
FIG. 1 is an explanatory diagram of a system for managing terminal groups embodying the present invention.

In FIG. 1, a plurality of black points show a plurality of terminals having terminal numbers such as AA~AA, BB~BB, and CC~CC, respectively.

Further, reference numerals 0 to 9 respectively designate terminal groups, each of which constitutes a terminal group per kind of services including unspecified services and to which a plurality of terminal numbers belong. For example, a terminal group 0 means a group having no service, a terminal group 1 means a group of terminals obtaining a service A, and a terminal group 2 means a group of terminals obtaining a service B.

Accordingly, there is a case where a terminal belongs to a plurality of terminal groups to obtain plural services. That is, the terminal XX~XX belongs to the terminal groups 2 and 9 to obtain the services B and X.

It is a basic concept of the present invention to register a subscriber private number or group abbreviated dialing number so that a terminal group is correlated with a terminal.

A table 10 shown in FIG. 1 explains a content of the registration of the subscriber private numbers. For example, the terminal groups are expressed by the first figures of 0 to 9 and the numbers of terminals are expressed by the second figure and third figure of 00~19, according to the use of the number of 3 figures.

Accordingly, the subscriber private number of "*000" is registered to correspond to the terminal AA~AA which is not subscribed to the specified service provided for the terminal group 0 by the communication terminal. The number of "*O" corresponds to the terminal group 0, and "00" corresponds to the terminal "AA~AA".

In this case, the number is registered to a terminal group managing data for example, by inputting 0*1 (~9 terminal group number) +00 (~19) from a communication terminal.

Further, it is possible that each of the terminals belongs to the plurality of terminal groups. For instance, the terminal XX~XX belongs to two terminal groups 2 and 9 as it obtains the services B and X.

Accordingly, two subscriber private numbers "*219" and "*919" are registered as shown in table 10. Numbers "*2" and "*9" correspond to the terminal groups 2 and 9, respectively. Further, the number "19" is common and corresponds to the terminal XX~XX.

Further, the registration is also released by inputting the number O**1 (~9)+00 (~19) from the communication terminal, similarly.

A more specific concept of managing the terminal groups will be now described, based on the above-described basic concept of the present invention.

Figure 2:
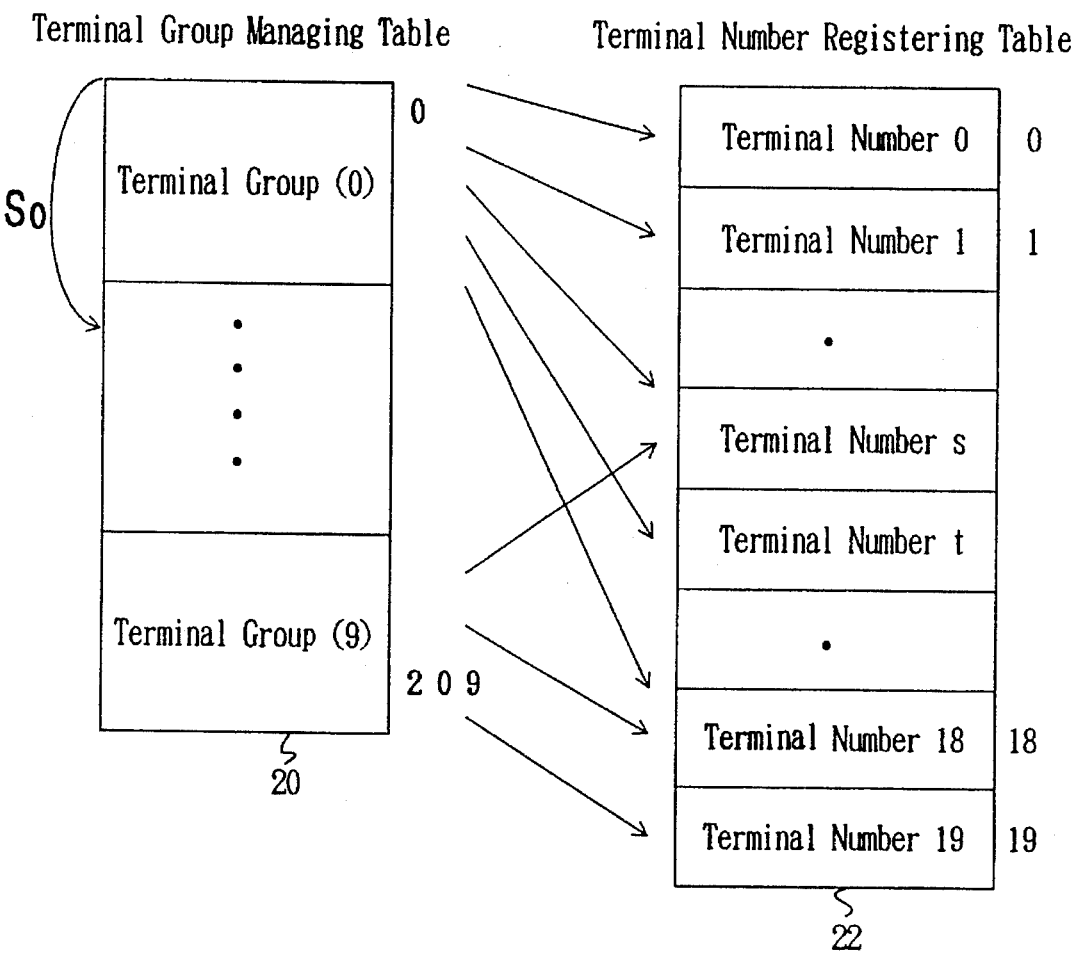
FIG. 2 is an example (No. 1) of terminal group managing data.
Figure 3:
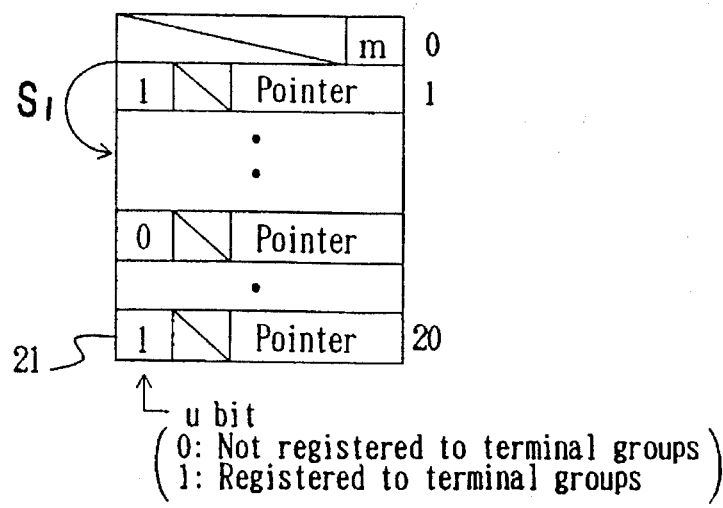
FIG. 3 is another example (No. 2) of terminal group managing data.
Figure 4:
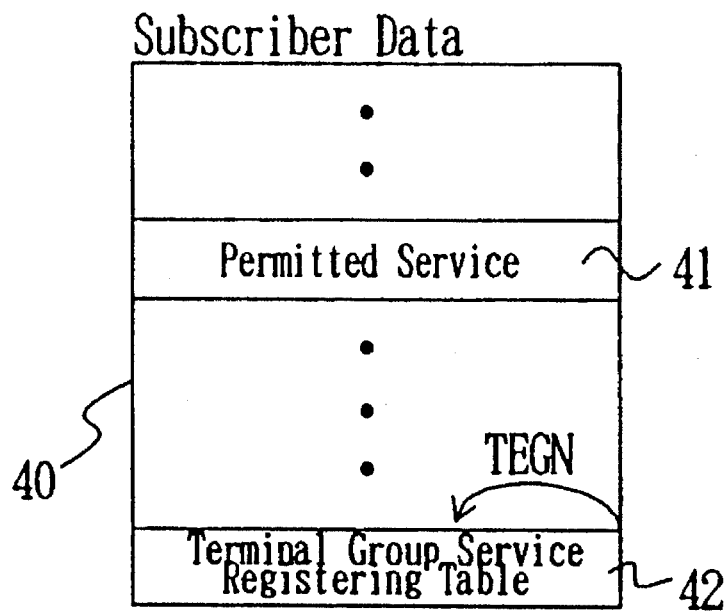
FIG. 4 is an example (No. 1) of terminal group exchange controlling data.
Figure 5:
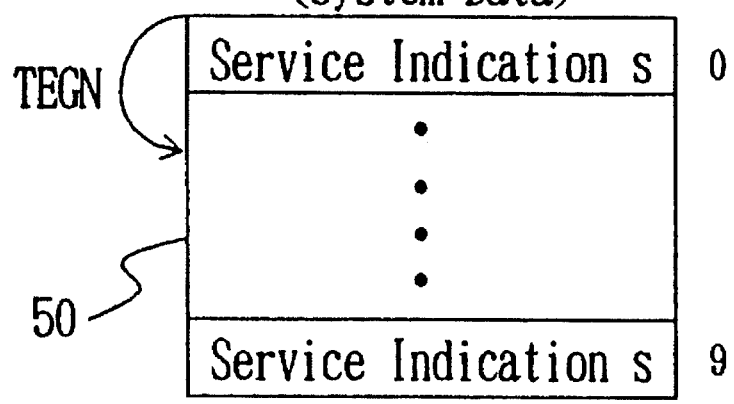
FIG. 5 is another example (No. 2) of terminal group exchange controlling data.
Figure 6:
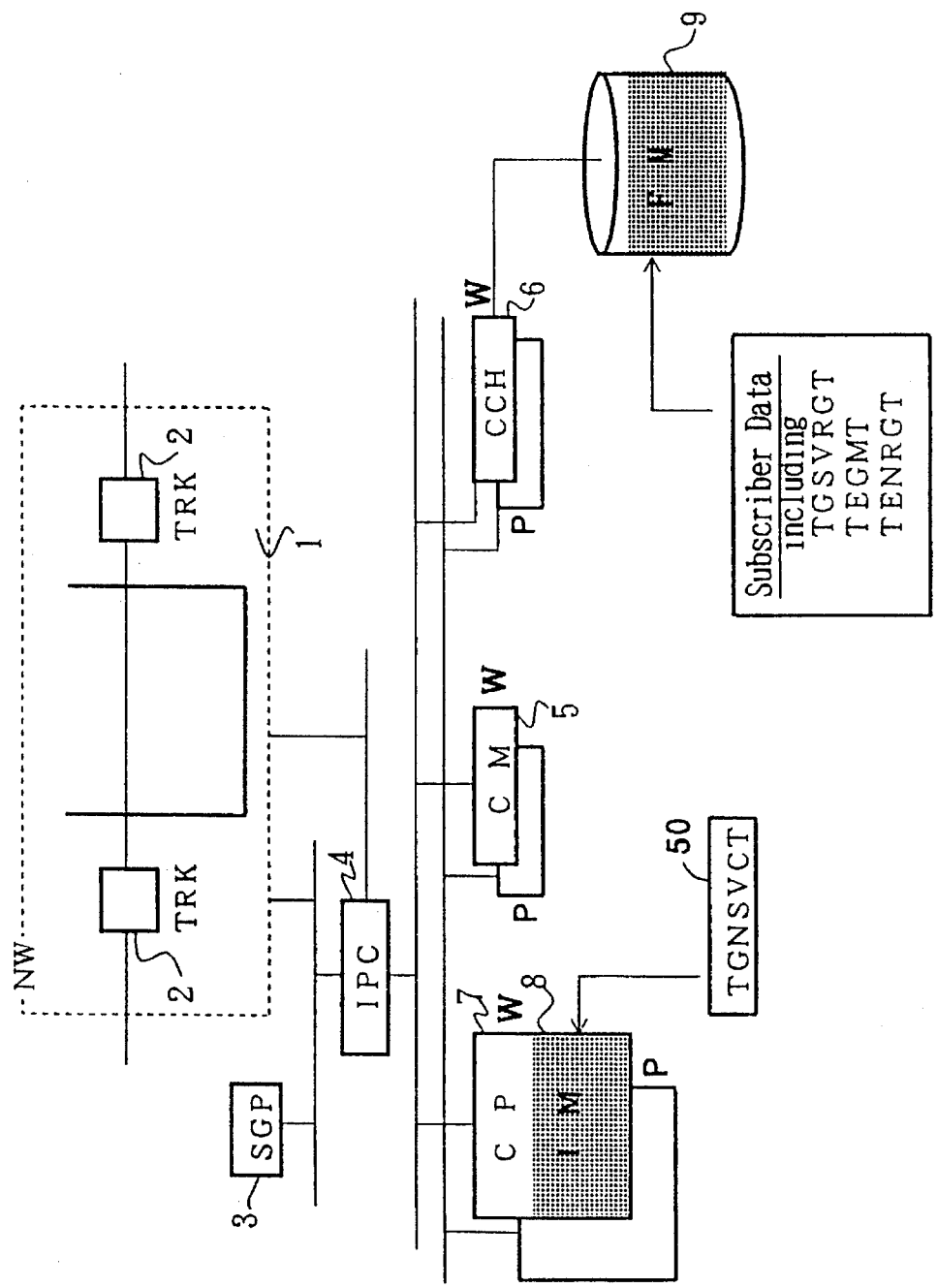
FIG. 6 is a block diagram of terminal group exchange controlling system.

FIGS. 2 and 3 show examples of the terminal group managing data according to an embodiment of the present invention. FIGS. 4 and 5 are examples of the terminal group exchange controlling data according to an embodiment of the present invention. FIG. 6 is a block diagram of the terminal group exchange controlling system of the present invention.

In FIG. 2, a terminal group managing table 20 registers each content for managing each of terminal groups (0)~(9) as will be explained below. Reference numeral 22 is a terminal number registering table.

FIG. 3 illustrates one example of the content for managing one terminal group in the terminal group managing table 20. The case where 10 terminal groups of (0)~(9) are registered in the terminal group managing table 20 and 20 terminals are registered at the positions 0~19 in the terminal number registering table 22 as shown in FIGS. 2 and 3.

In the drawings, SO means the terminal group numbers (0)~(9). And S1 shows the terminal numbers 1~20.

In FIG. 2, the managing table 21 shown in FIG. 3 is registered in the terminal group managing table 20, in correspondence to each of the terminal groups (0)~(9). The managing table 21 shown in FIG. 3 corresponding to the terminal group (n) has an area for 21 words.

"m" in the first word of table 21 of FIG. 3 indicates whether it is in a normal mode (m=O) or in a group service mode (m=1). Further, pointers for showing the positions in which the terminal numbers are registered in the terminal number registering table 22 are specified in the second to the twentieth words of table 21 for all twenty terminals.

Further, 1 which means "to register the terminal group" or 0 which means "not to register the terminal group" is set to the u bit of the second word to the twentieth word to indicate whether or not each terminal number is registered in the appropriate terminal group (n) of the table 20. Accordingly, the terminal group managing table 20 is correlated with the terminal number registering table 22 as shown in FIG. 2.

In the diagram shown in FIG. 2, terminal numbers O, 1, s, t and 18 belong to the terminal group (0), and terminal numbers s, 18 and 19 belong to the terminal group (9).

Further, there is a case, where the same terminal belongs to a plurality of terminal groups, as described above. In the example shown in FIG. 2, the terminal numbers s and 18 also belong to the terminal groups (0) and (9), respectively.

Numbers 0 and 209 attached to the terminal group managing table 20 express the number of words. That is, the terminal managing table 20 has 10 terminal groups which have storage areas for 21 words, individually, so that table 20 has the number of the total sum of 210 words.

Further, FIGS. 4 and 5 are explanatory diagrams for explaining an example of the terminal group exchange controlling data. FIG. 4 shows a subscriber data table 40. Data table 40 is created and registered per each subscriber. A service permitted to an appropriate subscriber is indicated in data table 40.

The information in an area 42 indicates to which one of the terminal groups obtaining the permitted services a respective terminal belongs. That is, in the case where the terminal belongs to the terminal groups 0 and 9 of the terminal groups which can obtain permitted services 41, the numbers of terminal groups 0 and 9 are indicated in the area 42. Accordingly, in this case it is possible for the terminal to obtain only services provided by the terminal groups 0 and 9.

FIG. 5 shows a terminal group number service corresponding table 50 as one of the system data. The kinds of services provided by controlling with a switch are indicated in the terminal group number service corresponding table 50.

The connecting control of the switch for the services indicated in table 50 is performed by a processor which executes a software, which controls the procedure executing services, as performed in the conventional system.

FIG. 6 is a block diagram of the terminal group exchange controlling system. The present invention can be applied to this system as an office switch or a private branch exchanging system (PBX).

In FIG. 6, reference numeral "1" is a network, "2" is a trunk, and "3" is a signal processor. Numeral "4" is a communication controller between processors; "5" is a common memory; "6" is a channel controller; "7" is a central processor; "8" is an individual memory, and "9" is a file memory.

The terminal group managing table 20, the terminal number registering table 22, and the subscriber data table 40 as described above are stored in the file memory 9 shown in FIG. 6. On the other hand, the terminal group number service corresponding table 50 is stored in the individual memory 8, as it is a system data.

The operations of parts directly relating to the exchange controlling system for managing the terminal groups according to the present invention will be described in connection with FIG. 6.

The system shown in FIG. 6 has a double structure in a common memory 5, a channel controller 6, a central processor 7, and a file memory 8 for working mode W, and for protection mode P, respectively.

The signals between the above-described devices are sent and received via the communication controller 4. The central processor 7 controls the system according to a control software for controlling the procedures of executing the services and system data, which are stored in the individual memory 8.

The terminal group number control service corresponding table 50 described in connection with FIG. 5 above is stored in the individual memory 8. Accordingly, the central processor 7 executes and provides services indicated in the service corresponding table 50 to the subscriber who is registered to receive the services and has sent a call, based on a control software for controlling the procedures for executing the services.

Then, when the services indicated in the service corresponding table 50 are executed, it is determined what kind of contents the service has, depending on the contents shown in the subscriber data table 40, the terminal group managing table 20 and the terminal number registering table 22 stored in the file memory 9.

That is, the central processor 7 reads the subscriber data of the subscriber who sent the call, at first from table 40 in the file memory 9. The permitted services are indicated according to the requirement of the appropriate subscribers in the subscriber data table 40 (refer to the area 41 of the subscriber data table 40 shown in FIG. 4).

Further, the information showing which service of the permitted services the subscriber can obtain is registered in the area 42 of the table of the subscriber data table 40. Consequently, the central processor 7 recognizes as to what kinds of services is the subscriber registered, from the area 42 of the subscriber data table 40.

The processor 7 refers to the terminal group managing table 20 based on the above-described recognition. Then it refers to the data table 21 of the terminal group corresponding to the terminal group number registered in the area 42 of the subscriber data table 40 (refer to FIG. 4).

The processor 7 recognizes which terminal number is registered in the appropriate terminal group (n) in the status of u bit, based on the above-described reference.

Therefore, processor 7 executes the processing according to the service indication of the terminal group number service corresponding table 50 stored in the individual memory 8, to fulfill the relation between the terminal managing table 20 and the terminal number registering table 22 shown in FIG. 2.

That is, processor 7 executes the service indicated for the terminal numbers registered to belong to the terminal group corresponding to the terminal group number (TEGN) registered in the area 42 of the subscriber data table 40.

Further, when "m" of the first word shown in FIG. 3 is 0 and the terminal group is in the normal mode, a call request for the terminal group is exchanged and controlled, same as the conventional abbreviated dialing function. That is, the call request is connected to a terminal translated from the subscriber private number or group abbreviated dialing number inputted from the communication terminal or telephone terminal based on the terminal group managing data.

Hereupon, the translation based on the terminal group managing data is performed as follows. A corresponding terminal group in the terminal group managing table 20 is searched for, according the first figure of an inputted subscriber private number from the terminal group managing table 20 stored in the file memory 9, when the processor 7 receives the subscriber private number inputted from a calling terminal via the communication controller 4.

Further, the pointer of the word registered in the terminal group, u bit of which is 1, is specified by the second and third figure, referring to the u bit of each word of the searched terminal group.

Furthermore, the position of the terminal number registering table 22 corresponding to the specified pointer becomes a terminal number to be connected, so that the terminal number is connected, based on the control of the processor 7.

Next, the services to which the present invention may be applied, will be described.

Figure 7:
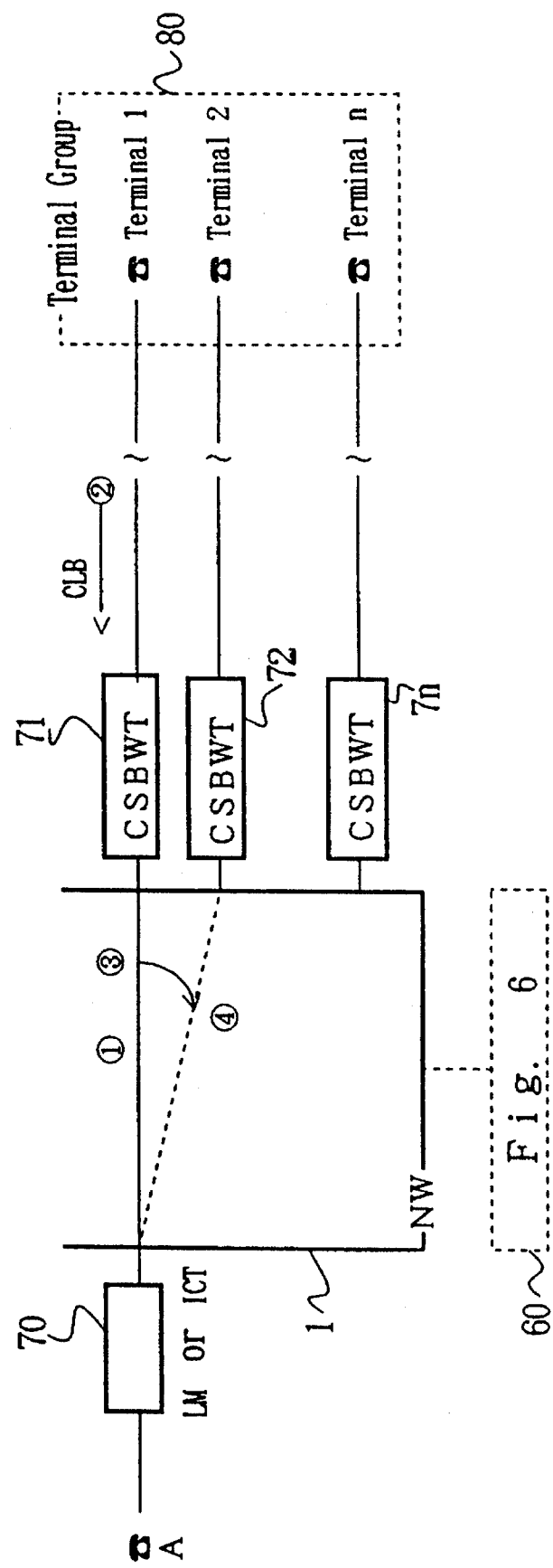
FIG. 7 is a block diagram which illustrates an example for applying the system for managing terminal groups of FIG. 6 to a continuous calling service.

FIG. 7 shows an embodiment where the present invention is applied to the continuous call service. It is supposed that the terminal group corresponding to the continuous call service and the terminals 1 to n belonging to this group are registered by the operation of the communication terminal of the subscriber A. Further, the operation for registration is the same as described above.

In FIG. 7, reference numeral "70" is a line memory LM or an incoming trunk ICT. More particularly, ICT is provided in the case of a mobile radio telephone system and so on.

Reference numeral "1" is a network, and "60" is of the same structure as shown in FIG. 6, except for the network of the system.

Reference numerals "71~7n" are common line signal bidirectional trunks (CSBWT). The CSBWT is provided to each of the terminals 1 to n constituting terminal group 80.

In the embodiment shown in FIG. 7, the central processor 7 controls the network 1 to communicate between the subscriber A and the terminal 1 belonging to the terminal group 80 at first (1 of FIG. 7).

When the call with the terminal 1 is finished, a clear back signal CLB is sent to disconnect the line from the terminal 1 (2 of FIG. 7).

Further, central processor 7 releases the line for the terminal 1 by controlling the network (③ of FIG. 7). Then, processor 7 sets a call to connect the subscriber A to the terminal 2 via the common line signal bidirectional trunk CSBWT 72 (④ of FIG. 7).

Furthermore, when the call with the terminal 2 is finished, a clear back signal CLB is replied, and the call with the terminal 2 is completed, so that the line for the terminal 2 is released.

Then, when the call with one terminal is finished and the line is released, subsequently, the call is sent to the next terminal. In this way, the service for continuously sending the call from the subscriber A is performed for all the terminals 1~n registered to belong to the terminal group 80, continuously.

Thus, the subscriber A has no need to perform the operations of dialing for the terminals 1~n repeatedly.

Figure 8:
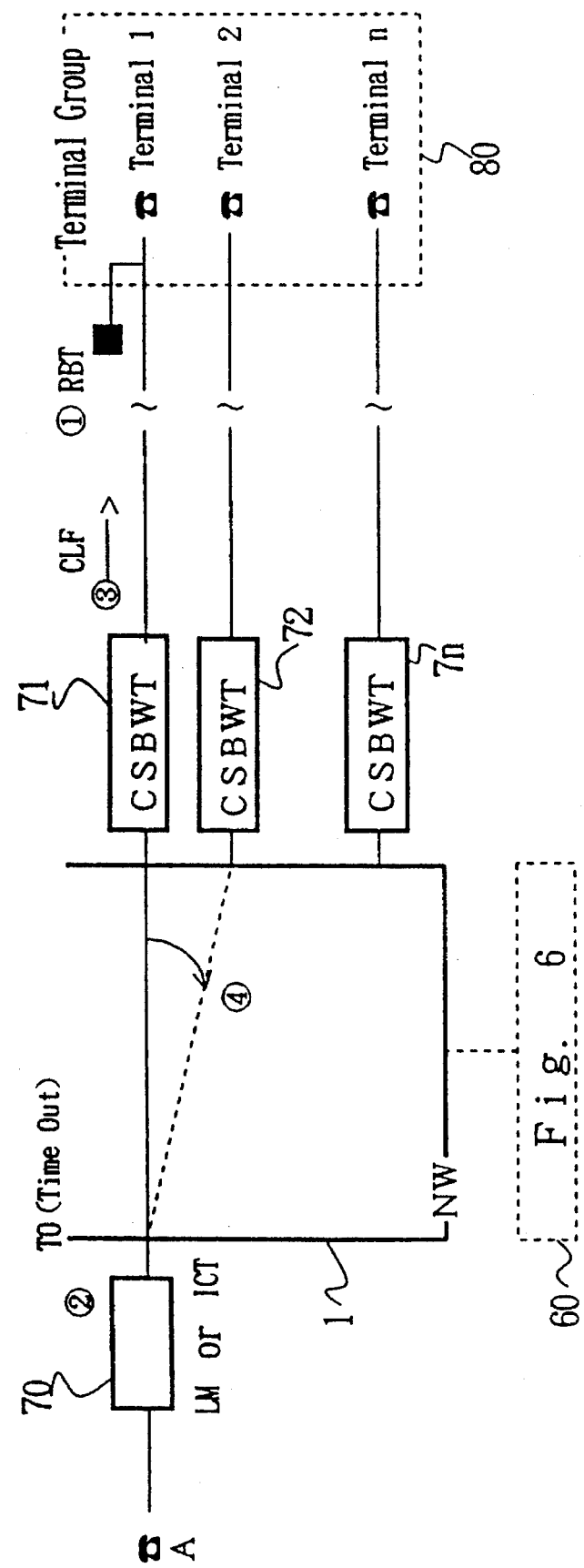
FIG. 8 is a block diagram which illustrates an example for applying the exchange controlling system for managing terminal groups of FIG. 6 to a destination switching service.

FIG. 8 further shows another example of application of the present invention for performing the service of switching a connected line.

Parts of the system shown in FIG. 8 are the same as those shown in FIG. 7. The method for registering terminals to belong to the terminal group in FIG. 8 is also the same as in the above-described example.

In the applied example shown in FIG. 8, if, for example, subscriber A calls, the call is sent to the terminal 1 of the terminal group 80 at first.

The central processor 7 counts the ring back tone RBT for a predetermined time from the starting time of calling (① in FIG. 8). In the case where there is no response from terminal 1 for a predetermined time, the clear forwarding signal CLF is sent to terminal 1 (② in FIG. 8) to release line for the terminal 1 (③ in FIG. 8).

Then, the call for terminal 2 is set (④ in FIG. 8). In the same way, the call is switched until the response is received, subsequently, for the terminals registered to belong to the terminal 80.

The call is transferred to the terminal, which replied, of the terminal group 80. In this way, the subscriber A can call to either one of terminals 1~n belonging to the terminal group 80 with only one operation by switching the destination of the call.

Figure 9:
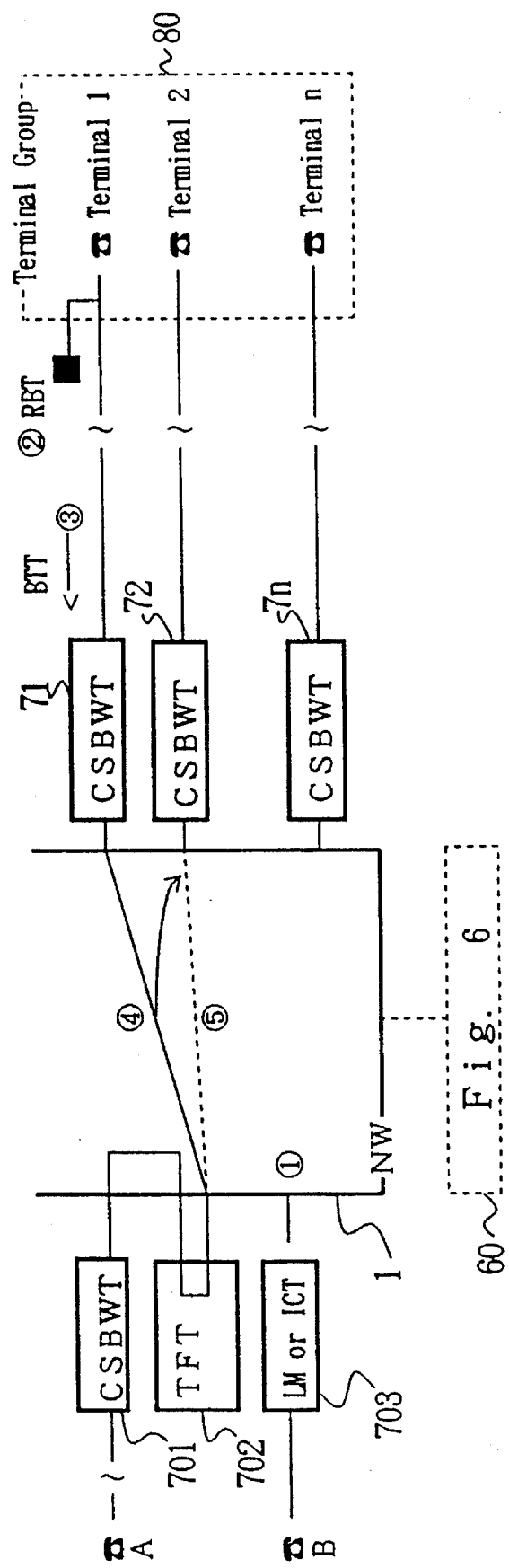
FIG. 9 illustrates an example for applying the system of FIG. 6 to a call-transferring switch service.

FIG. 9 shows an example of applying the system of the present invention to the service for switching the call destination.

In this example, a terminal as a destination to which the call is transferred is registered to belong to the terminal group 80 which can become the service by registering the subscriber B to the communication terminal group 80. The registration is performed according to the registering procedure described above.

Further, subscriber A is connected to the common line signal bidirectional trunk CSBWT 701 having an interface function between switches, via a switch not shown in the drawings. In the case where subscriber A calls to the subscriber B, the call is sent to the subscriber B, based on the control of the central processor 7.

However, for example, in the case where the line of subscriber B has already been busy, that is, no response from subscriber B has been received for the predetermined time, the line of subscriber A cannot be connected to that of subscriber B. In this case, the call is transferred to each terminal registered to belong to the terminal group 80 as a call destination by subscriber B, in advance.

At first, a call of the subscriber A is controlled by the central processor 7 so as to be sent to the terminal 1 belonging to the terminal group 80 via a transfer trunk TFT 702.

A ring back tone RBT is sent from the terminal 1, and if terminal 1 is busy, a busy tone (BTT) is received. After the line of the terminal 1 is released, the call is set to terminal 2 (⑤ of FIG. 9).

In this way, it becomes possible to set the call to each of the terminals in the terminal group 80, subsequently, and the call for the subscriber B is transferred to either of the terminals 1~n in the terminal group 80 registered to set in advance by the subscriber B.

Figure 10:
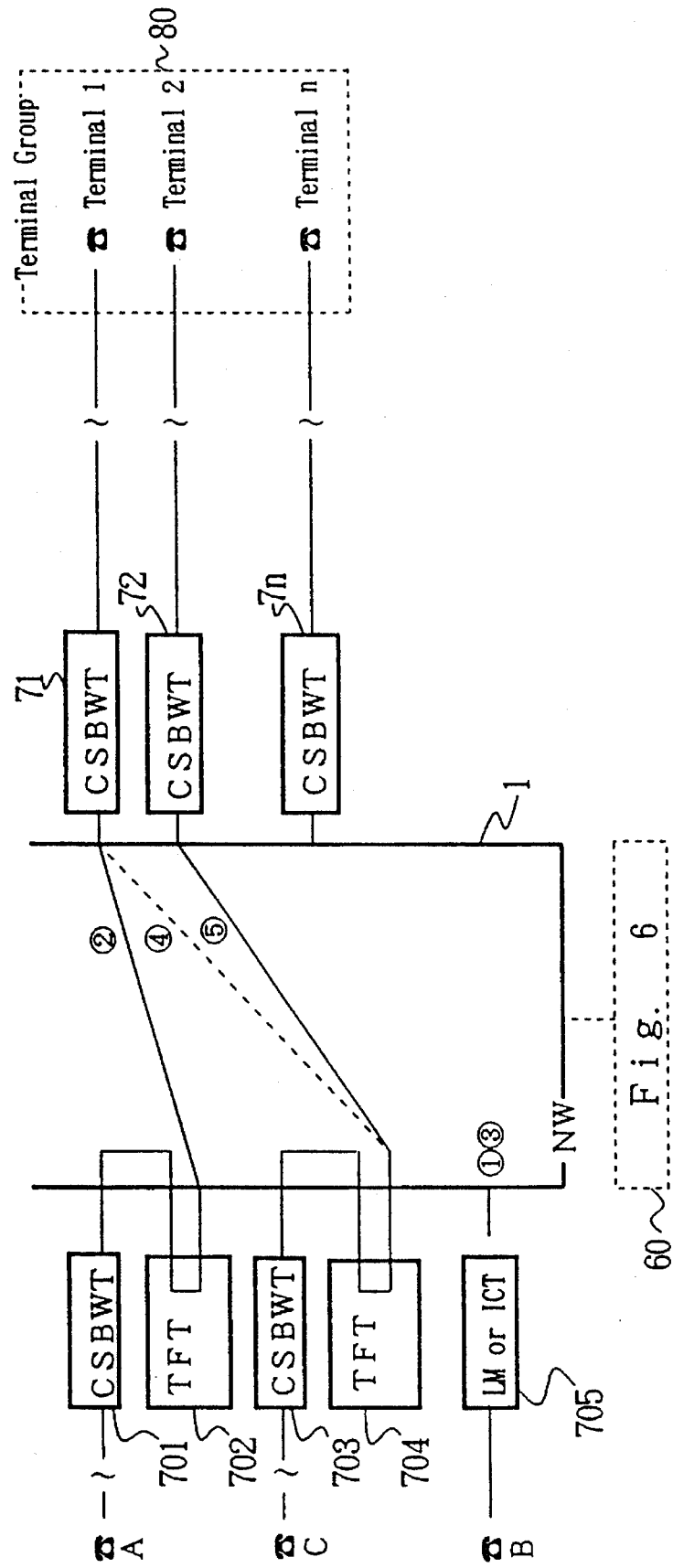
FIG. 10 illustrates an example for applying the system of FIG. 6 to a multiple-transferring service.

FIG. 10 shows an embodiment of the multiple call transferring service applied to the present invention.

In FIG. 10, subscribers A and C are each connected to the common line signal bidirectional trunks CSBWTs 701 and 703, via the switches not shown in FIG. 10.

Meanwhile, the terminals 1~n as call destinations are registered to belong to the terminal group 80 in advance by the subscriber B. At first, when a call is sent out from the subscriber A, subscriber B is called by the control of the central processor 7.

In the case where the call sent to the subscriber B is not replied for a predetermined time, the central processor 7 detects the time out (1 of FIG. 10). Then, the central processor 7 calls to the terminal 1 of the terminal group 80 as a call transferred destination for the call of the subscriber A, so that it becomes possible to talk between the subscriber A and the terminal 1 via the transfer trunk TFT 702.

When a call from subscriber C to subscriber B is sent to the common line signal bidirectional trunk CSBWT 703, the central processor 7 controls communication to send the call to the subscriber B (② of FIG. 10).

As same as the processing of the call from the subscriber A as described above, the central processor 7 detects the time out, when the response from the subscriber B is not received for the predetermined time (③ of FIG. 10). Then, the central processor 7 controls communication to transfer the call sent to the subscriber B from the subscriber C, to the terminal 1 in the terminal group 80.

In this case, the subscriber A has already talked with the terminal 1 (④ of FIG. 10). Accordingly, the central processor 7 calls for the terminal 2 as a second destination (⑤ of FIG. 10). If the terminal 2 can reply to the call, the subscriber C can talk with the terminal 2.

Thus, in the example of FIG. 10, it is possible to multiple-transfer the calls from the plurality of the subscribers by registering the plurality of terminals as call destinations, to belong to the terminal group 80 by the subscriber B in advance.

Figure 11:
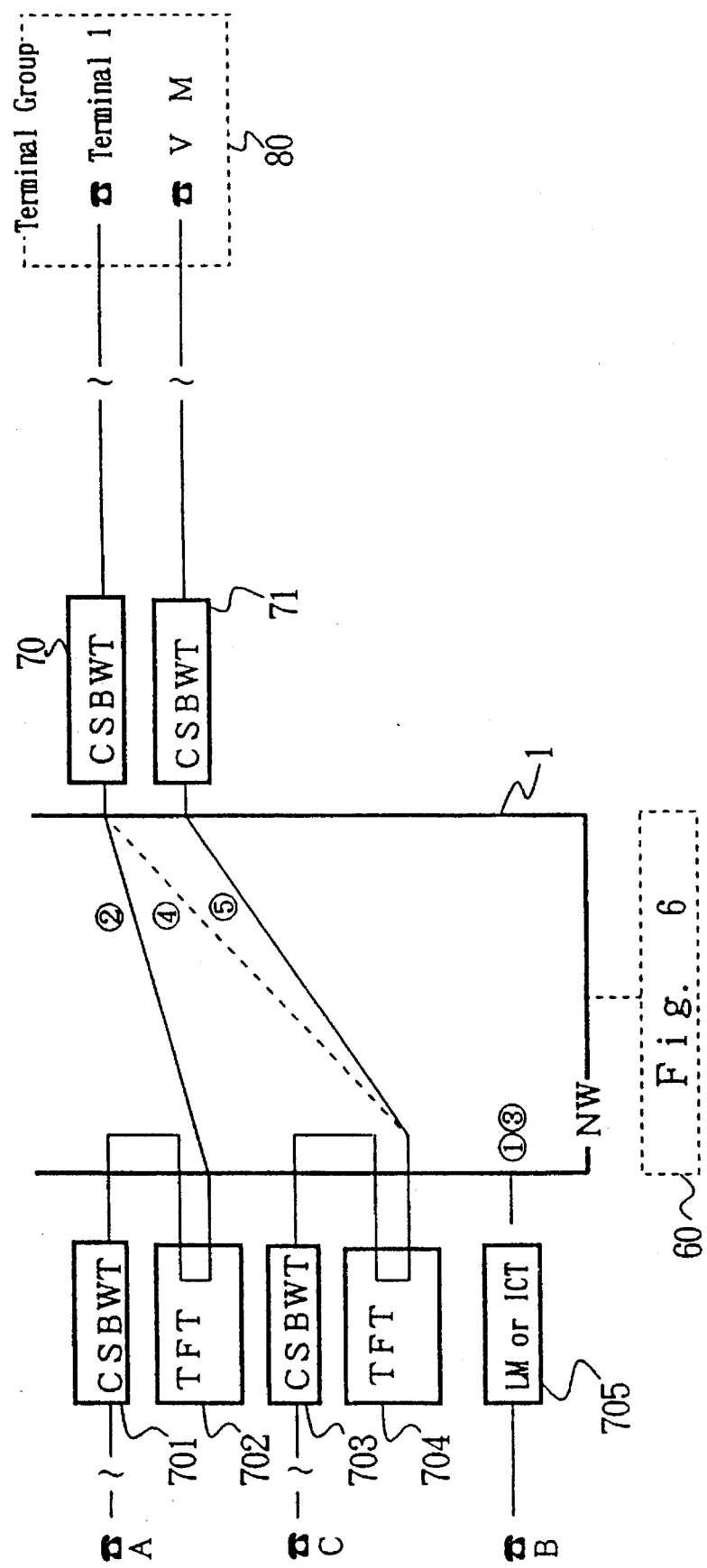
FIG. 11 illustrates an example for applying the system of FIG. 6 to a call recording and receiving switch service.

FIG. 11 is a still another example of application of the present invention to the call recording and transferring services.

The difference between the examples shown in FIG. 11 and the FIG. 10 resides that the terminal 1 and a voice mail are registered to belong to the terminal group 80 by the subscriber B with the operation of a communication terminal.

Now, when a call is sent from subscriber A, the call is controlled by central processor 7 to be sent to subscriber B.

Figure 12:
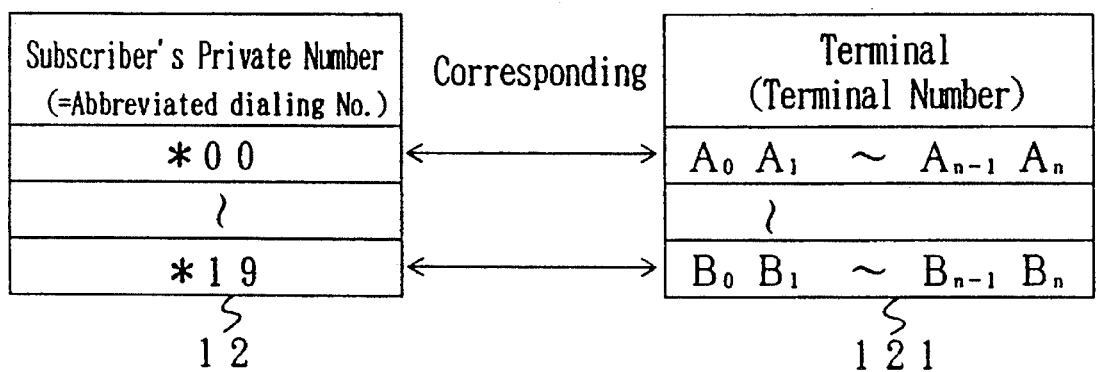
FIG. 12 is an explanatory diagram of the conventional abbreviated dialing system.

In the case where the subscriber B does not reply for a predetermined time, the central processor 7 detects time out (① of FIG. 11). Then, the central processor 7 calls terminal 1 in the terminal group 80, as a call destination for the call of the subscriber A, so that the talking becomes possible between the subscriber A and the terminal 1, via the transfer trunk TFT 702 (② of FIG. 12).

Then, when a call from subscriber C to subscriber B is sent to the common line signal bidirectional trunk CSBWT 703, the central processor 7 controls the call to the subscriber B.

Similarly to the above-described processing of the call from the subscriber A, if the response from the subscriber B is not received for the predetermined time, the central processor 7 detects the time out (③ of FIG. 11). Then, the central processor 7 controls the call from the subscriber C to the subscriber B to transfer the call to the terminal 1 in the terminal group 80.

In this case, subscriber A has already talked with the terminal 1 (④ of FIG. 11) Accordingly, the central processor 7 calls the voice mail VM as the second call destination. Thus, the call of subscriber C is connected to the voice mail VM belonging to the terminal group 80. Then, the call of subscriber C is stored and registered in the voice mail VM.

In this way, it becomes possible to process the calls of the plural subscribers A to C by using the terminals and the voice mail belonging to the terminal group 80.

As described above, it becomes possible according to the present invention to provide a new subscriber service employing the terminal groups including the conventional abbreviated dialing function, by allowing to control a plurality of terminals having the same communication purposes as a group.

Further, it becomes possible to simplify the procedure for expressing the relation between the services and the terminally.

The invention may be embodied in other specific forms without departing form the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An exchange controlling system for managing terminal groups, comprising:

a plurality of terminals each being assigned an individual terminal number, said plurality of terminals being changeably arranged in groups, formed as switch service groups, each group being assigned a group number corresponding to a switch service;

a network for connecting a call from a subscriber to a destination terminal among the plurality of terminals; and a central processor, operatively connected to the network, for controlling the network so as to connect the call from the subscriber to the destination terminal which is identified by a private subscriber number dialed by the subscriber and composed of at least one digit corresponding to the group number of a group that the destination terminal is arranged in and at least one digit corresponding to the destination terminal number and to perform the switch service corresponding to the group number.

2. The exchange controlling system according to claim 1, wherein each terminal is registered to belong to one or more of said switch service groups.

3. The exchange controlling system according to claim 1, and further comprising memory means for storing a first table for registering terminal numbers each assigned to a corresponding one of the plurality of the terminals, a pointer for indicating a registered position for each of the terminal numbers registered in the first table, and a second table for registering group numbers assigned to the switch service groups, and indicating whether or not each of the terminals is registered to belong to a corresponding switch service group, wherein the central processor controls the network to connect a call from a subscriber to a terminal which belongs to a switch service group for a switch service.

4. An exchange controlling system for managing terminal groups, comprising:

a plurality of terminals having terminal numbers and being changeably arranged in switch groups;

a network for connecting a call from a subscriber to a terminal;

a central processor operatively connected to the network for controlling the network;

an individual memory for storing control data, by which the central processor controls the network, and a table having data of correspondences of switch services and switch groups which are permitted to receive the switch services; and a file memory having a first table for registering terminal numbers each assigned to a corresponding one of the plurality of terminals, a pointer for indicating a registered position for each of the terminal numbers registered in the first table, and a second table for indicating whether or not each of the terminals is registered to belong to the corresponding switch service group, wherein the central processor controls the network to connect a call for a switch service from a subscriber to a terminal which belongs to a switch service group corresponding to the switch service.

5. The exchange controlling system according to claim 4, wherein a registration of terminals to belong to a corresponding switch service group, which is permitted for a sequential call service, is previously executed by an operation of a subscriber, and the central processor controls the network to sequentially connect a call from the subscriber to the terminals registered to belong to the corresponding switch service group of a sequential call service.

6. The exchange controlling system according to claim 4, wherein a registration of terminals to belong a corresponding switch service group, which is permitted for a call transferring service, is previously executed by an operation of a subscriber, and the central processor controls the network to connect a call from the subscriber to a first terminal registered to belong to the corresponding switch service group of the call transferring service, and to transfer the call to a next terminal registered to belong to the corresponding switch service group of the call transferring service if there is no response for a predetermined time to the call from the first terminal.

7. The exchange controlling system according to claim 4, wherein a registration of terminals to belong to a corresponding switch service group, which is permitted for a call transferring service, is previously executed by an operation of a call receiving subscriber, and the central processor controls the network to connect a call sent from a call receiving subscriber, and to transfer the call to a terminal registered to belong to the corresponding switch service group of the call transferring service if there is no response for a predetermined time to the call from the call receiving subscriber.

8. The exchange controlling system according to claim 4, wherein a registration of terminals to belong to a corresponding switch service group, which is permitted for a multiple call transferring service, is previously executed by an operation of a call receiving subscriber, and the central processor controls the network to connect a first call to be sent from a first call sending subscriber to the call receiving subscriber, to transfer the call to a second terminal registered to belong to the corresponding switch service group of the multiple call transferring service if there is no response for a predetermined time to the call from the first call receiving subscriber, and to transfer a second call to be sent from a second call sending subscriber to the second call receiving subscriber, to a third terminal which is registered to belong to the corresponding switch service group of the multiple call transferring service.

9. The exchange controlling system according to claim 8, wherein the second terminal is a voice mail.

\* \* \* \* \*